April 30, 1957     W. D. FLYNN, SR     2,790,265
RELEASABLE BAIT RIG SUPPORT
Filed May 10, 1956
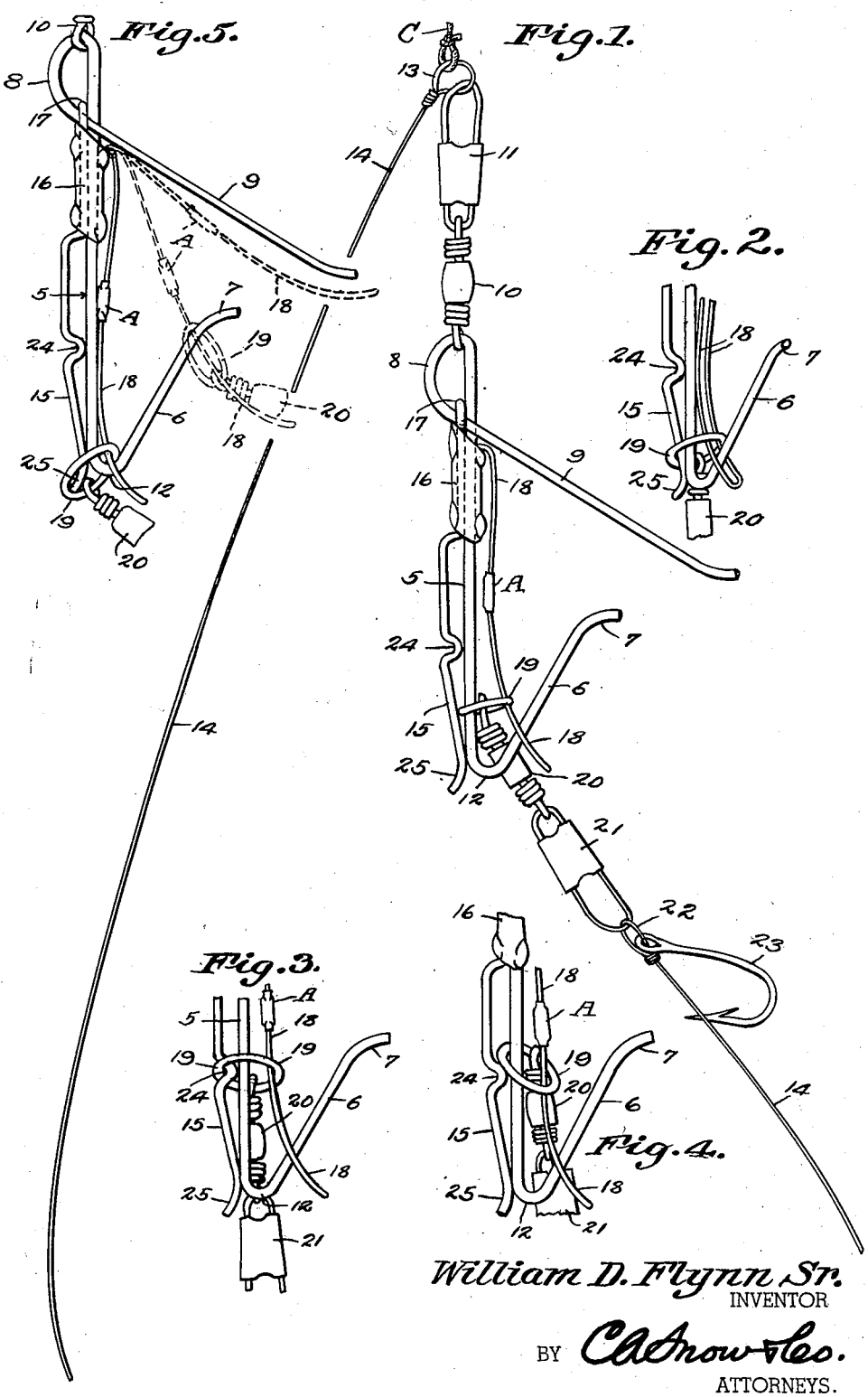
William D. Flynn Sr.
INVENTOR

United States Patent Office 2,790,265
Patented Apr. 30, 1957

2,790,265

RELEASABLE BAIT RIG SUPPORT

William D. Flynn, Sr., Jacksonville, Fla.

Application May 10, 1956, Serial No. 584,114

8 Claims. (Cl. 43—43.1)

This invention relates to a device designed for attachment to the loop at one end of a substantially long leader connected to a fishing line, the primary object of the invention being to provide means whereby the bait rig may be temporarily held at the tip end of the casting rod during the initial forward movement of the rod during casting, and released when the desired length of line has been payed out in completing what is commonly known as an overhead cast, the device automatically releasing the bait rig to the action of the rod and line for normal fishing at the termination of the cast, thereby resulting in a substantially longer and more accurate casting of the bait rig, particularly wherein exceptionally long leaders and awkward bait rigs are used, as in salt water fishing.

An important object of the invention is to maintain the normal balance between the rod, reel, line and rig which are usually carefully selected to meet individual casting requirements, regardless of the length of the leader used, and to further place the weight of the bait rig at the tip of the rod, which is necessary for longer and more accurate casting with greater assurance of the bait or lure striking the water at the intended spot or target.

A further object of the invention is to provide a device of this character which may be readily attached as a unit used in conjunction with fishing rigs, and one which may be set or adjusted as to sensitivity of operation, thereby adapting the device for use in fishing with small, medium or large fishing rigs and particularly wherein substantially long leaders are used.

Other and further objects and advantages of the invention will be hereinafter described and the novel features thereof defined in the appended claims.

Referring to the drawing:

Fig. 1 is a view illustrating a device constructed in accordance with the invention as connected to a fishing line leader attaching loop with the device set in its most sensitive position for releasing a light bait rig.

Fig. 2 is a view illustrating the device as set for use in fishing for slightly larger fish wherein the bait rig is slightly heavier.

Fig. 3 is a view illustrating the device set for fishing for still larger fish wherein the weight of the bait rig is further increased.

Fig. 4 is a view illustrating the device set for use in fishing for exceptionally large fish wherein the bait rig is exceptionally heavy.

Fig. 5 is a view illustrating the various positions of the pick-up ring of the device as it is being released from the lug hook of the device.

Referring to the drawing in detail, the device comprises a lug hook indicated generally by the reference character 5, which hook is formed of a length of heavy wire material bent to provide a laterally extended hook 6 at one end thereof, the hook terminating in an outwardly curved end portion 7.

At a point intermediate the ends of the lug hook is a loop 8 with the remaining portion of the length of wire material extending downwardly and laterally providing a guard prong 9 which is so arranged that it will overlie the end of the hook 6, as clearly shown by the drawing, to guard the hook 6 against the hook catching in vegetation or foreign matter with which the lug hook would ordinarily contact during fishing.

As shown by Fig. 5 of the drawing, the loop 8 to which the swivel 10 of the fastener 11, is connected, is in direct line with the curved portion 12 of the lug hook, or that portion of the length of heavy wire material, where the laterally extended hook merges with the main portion of the lug hook, to the end that as the lug hook is being manipulated as in casting, the bait rig will move in a direct line with the end of the fishing line which is attached to the loop 13 of the leader 14 of the fishing rig.

The reference character 15 indicates a spring holding arm which is secured to the main bar of the lug hook, by means of the sleeve 16 which sleeve embraces the portion of the spring holding arm 15 at a point below the eye 17 which is formed by looping the extremity of the arm 15 adjacent to the loop 8, around the guard prong 9, within the loop 8. It might be here stated that the sleeve 16 also provides means for securing one end of the kick-off spring arm 18 to the main bar of the lug hook, since in pressing the sleeve 16 around the main portion of the lug hook, and spring holding arm 15, one end of the kick-off spring arm is inserted in one end of the sleeve, resulting in the kick-off spring being firmly held in position at one of its ends.

As clearly shown by the drawing, this kick-off arm 18 is constructed of light spring wire material bent upon itself providing a pair of parallel arms held together at points intermediate their ends, by means of the sleeve A which is clamped thereon.

The kick-off spring 18 is of a length to extend beyond the end of the guard prong 9, and is curved throughout its length, as better shown by Fig. 5 of the drawing. Since the kick-off spring arm 18 embodies a pair of arms, the kick-off spring may be moved downwardly over the laterally extended hook 6 to set the device.

Used in conjunction with the device, is a pick-up ring 19 which is of a diameter to fit over the laterally extended hook 6 and lower curved end of the spring holding arm 15 and at the same time hold the kick-off arm 18 into contact with the main portion of the lug hook as shown by Fig. 5. This ring is attached to one end of the leader 14 by means of the swivel 20 and fastener 21, the fastener 21 being connected with the leader 14, through the loop 22 at a point adjacent to the hook 23.

As shown, the spring holding arm 15 is formed with an offset portion providing a notch 24, the offset portion lying in close proximity to the main portion of the lug hook, with the curved end 25 contacting with the main portion of the lug hook at a point adjacent to the laterally extended hook portion 6.

In using the device, the device is connected with the leader loop 13, by the swivel fastener 11, and the ring 19 is fastened to the other end of the leader through the loop 22, by means of the swivel fastener 21. The ring 19 is now brought upwardly and positioned over the laterally extended hook 6, with the kick-off spring extended through the ring 19. The ring 19 is now slid upwardly over the main portion of the lug hook to the position as shown by Fig. 1 of the drawing, which is in its most sensitive position to release the ring 19. A less sensitive position for the ring 19 is shown by Fig. 2. It is obvious that during the casting operation, the ring 19 which is positioned over the lug hook, will move by centrifugal force to a position wherein the ring 19 rests in the curved portion 12 of the hook 6, as the rod is being brought forward in casting.

It is obvious that when the rod is being moved through the air in making the cast, the ring 19 will be held against displacement. However when the cast has been completed and the line is in an extended position the kick-off arm 18 will operate to move the ring from a position as shown by Fig. 5 of the drawing at the base of the laterally extended hook 6, to the outer end of the hook 6, where the ring 19 will be kicked over the end 7 of the hook, releasing the bait rig for normal fishing.

When the device is used in connection with slightly heavier bait rigging, the ring 19 may be positioned over the spring holding arm 15 as well as over the kick-off arm 18, with the ring 19 resting in the notch 24, as shown by Fig. 3. With the ring 19 in this position, the kick-off arm 18 will be held against operation to release the hook end of the leader under the increased weight of a heavier bait rig.

In the event that the device is to be used with exceptionally heavy bait rigs, the ring 19 is set in position as shown by Fig. 4 of the drawing, with the ring resting between the inwardly extended portion of the spring holding arm 15 and main portion of the lug hook to insure the ring 19 being maintained in a set position under the strain of an exceptionally heavy bait rig during the initial movement of the casting rod during the casting operation, but to be released as or before the bait rig strikes the water at the intended spot or target.

It will of course be understood that the operation of the kick-off spring is identical in each case, regardless of the setting point of the ring 19, the variation in the setting point being necessary to prevent the release of the ring 19 from the lug hook during the initial rearward movement of the casting rod in casting.

From the foregoing it will be seen that due to the construction of the device forming the subject matter of the present invention, the bait rig connected to line C is held temporarily at the tip end of the casting rod, with the normal balance between the rod, reel and line maintained until the reel has payed out the desired length of line, and the bait rig has reached its target.

While the specific details of one embodiment of this invention have been herein shown and described, the invention is not confined thereto as changes and alterations may be made without departing from the spirit and scope thereof as defined in the appended claims.

What is claimed is:

1. A device of the class described, comprising a lug hook adapted to be connected to the loop at the end of a leader attached to a fishing line, a bait rig including a pick-up ring attached to the other end of said leader, said ring adapted to be positioned over said hook forming a loop in said leader and transferring the weight of the bait rig to the end of the fishing line, a spring holding arm secured to said hook engageable with said pick-up ring, normally holding said pick-up ring on said hook, and an outwardly biased kick-off spring arm mounted on said hook, extending through said ring, and said kick-off spring arm adapted to force said ring from said hook upon movement of said ring to a position at the base of said hook during casting of the fishing line, releasing said looped end of the leader and bait rig from said hook for normal fishing.

2. A device of the class described, comprising a lug hook adapted to be connected to the end of a leader connected to a fishing line, said lug hook embodying a main portion with a hook portion at one end and a guard prong at the other end guarding said hook portion, a spring holding arm secured at one side of the lug hook, an outwardly biased kick-off spring arm connected to the other side of said lug hook, a pick-up ring connected to the other end of said leader adjacent to the bait rig thereof, adapted to be positioned over said hook portion, main portion of said lug hook and kick-off spring arm, in contact with said spring holding arm, tensioning said kick-off arm and said kick-off arm adapted to force said pick-up ring and bait rig from said hook upon movement of said ring over the base of said hook, during casting of the line releasing the bait rig for normal fishing.

3. A device of the class described, comprising a lug hook adapted to be connected to the loop at one end of a leader attached to the end of a fishing line extending from the end of a fishing rod, a bait rig including a pick-up ring attached to the other end of said leader adapted to be positioned over said lug hook normally securing said leader to said lug hook in loop formation with the weight of said bait rig held at the tip end of a fishing rod during casting, and mechanism secured to said lug hook adapted to force said pick-up ring from said hook releasing the line and bait rig for normal fishing.

4. A device of the class described, comprising a lug hook adapted to be connected to the loop at one end of a leader attached to the end of a fishing line extending from the end of a fishing rod, a bait rig including a pick-up ring attached to the other end of said leader adapted to be positioned over said lug hook, normally securing said leader to said lug hook in loop form with the weight of said bait rig held at the tip end of the fishing rod during casting, a spring holding arm secured to said lug hook engageable with said pick-up ring adapted to temporarily hold said pick-up ring and bait rig against displacement during the initial movement of the lug hook during casting, and a spring kick-off arm mounted on said hook adapted to kick said pick-up ring from said hook at the end of the casting operation, releasing the bait rig for normal fishing.

5. The subject matter as claimed in claim 4 and said spring holding arm having a recess formed intermediate its ends, into which said pick-up ring is normally held.

6. A device of the class described, comprising a lug hook adapted to be connected to the loop at one end of a leader attached to the end of a fishing line extending from the end of a fishing rod, a bait rig including a pick-up ring attached to the other end of said leader adapted to be positioned over said lug hook normally securing said lug hook in loop form with the weight of said bait rig held at the tip end of a fishing rod during casting, a spring holding arm secured to said lug hook, said arm having an offset portion disposed intermediate its ends providing a notch into which said ring normally rests securing said ring against accidental displacement, during the initial movement of the lug hook during casting, said spring arm releasing said ring from the hook upon movement of said lug hook in one direction, and a kick-off spring arm contacting with said ring adapted to move said ring over said hook releasing the ring and bait rig for normal fishing.

7. A device of the class described, comprising a lug hook adapted to be connected to the loop at one end of a leader attached to the end of a fishing line extending from the end of a fishing rod, a bait rig including a pick-up ring attached to one end of said leader adapted to be positioned over said lug hook, transferring the weight of the bait rig to the tip end of the fishing rod, a spring holding arm secured to said lug hook adapted to engage said pick-up ring normally holding said pick-up ring against accidental displacement during the initial movement of said lug hook during casting, and mechanism including a spring arm engageable with said ring adapted to force said ring from said hook when the force of the casting has been spent, releasing the bait rig for normal fishing.

8. A device of the class described, comprising a body formed of a length of heavy wire material, a laterally extended elongated hook portion formed at one end of said body, a guard prong formed at the opposite end of said length of wire material overlying one end of said hook in spaced relation therewith, a bait rig including a pick-up ring secured to the other end of said leader adapted to be positioned over said lug hook, holding mechanism secured to said body engageable with said pick-up ring normally holding said pick-up ring on said body out of contact with said hook, said holding mechanism adapted to release said ring for movement onto said hook portion during the casting of the bait rig, and a spring kick-off arm engageable with said ring adapted to force said ring from said hook portion releasing said bait rig for normal fishing at the location of the casting target.

No references cited.